(12) United States Patent
Anuez et al.

(10) Patent No.: US 9,310,860 B2
(45) Date of Patent: Apr. 12, 2016

(54) THERMAL CHAMBER PARTITION AND FAN UNIT FOR COMPUTER SYSTEM

(75) Inventors: Tony O. Anuez, Tombalt, TX (US); Peter W. Austin, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 250 days.

(21) Appl. No.: 14/116,412

(22) PCT Filed: Jun. 15, 2011

(86) PCT No.: PCT/US2011/040445
§ 371 (c)(1),
(2), (4) Date: Nov. 8, 2013

(87) PCT Pub. No.: WO2012/173610
PCT Pub. Date: Dec. 20, 2012

(65) Prior Publication Data
US 2014/0092550 A1 Apr. 3, 2014

(51) Int. Cl.
*G06F 1/20* (2006.01)
*G06F 1/18* (2006.01)

(52) U.S. Cl.
CPC ........ *G06F 1/20* (2013.01); *G06F 1/181* (2013.01); *Y10T 29/49025* (2015.01)

(58) Field of Classification Search
CPC ........... G06F 1/20; G06F 1/206; G06F 1/181; G06F 1/26; H01L 23/467
USPC ........... 361/679.46, 679.48–679.51, 690–697
See application file for complete search history.

(56) References Cited

U.S. PATENT DOCUMENTS

| | | | | |
|---|---|---|---|---|
| 5,493,457 A * | 2/1996 | Kawamura | ............ | G11B 33/142 360/97.12 |
| 5,813,243 A * | 9/1998 | Johnson | ............ | G06F 1/20 361/678 |
| 5,876,278 A * | 3/1999 | Cheng | ............ | G06F 1/20 361/695 |
| 5,955,955 A * | 9/1999 | Corcoran, Jr. | ............ | G06F 1/20 340/607 |
| 6,005,770 A * | 12/1999 | Schmitt | ............ | H05K 7/2019 361/679.48 |
| 6,252,770 B1 * | 6/2001 | Yu | ............ | G06F 1/20 174/15.2 |
| 6,362,958 B1 * | 3/2002 | Yu | ............ | H05K 7/20581 165/104.34 |
| 6,538,886 B2 * | 3/2003 | Yu | ............ | G06F 1/20 165/122 |
| 6,597,569 B1 * | 7/2003 | Unrein | ............ | G06F 1/181 361/679.4 |
| 7,068,509 B2 | 6/2006 | Bash et al. | | |
| 7,593,223 B2 | 9/2009 | Kobayashi | | |
| 7,872,864 B2 | 1/2011 | Mongia et al. | | |
| 7,885,062 B2 | 2/2011 | Wagner et al. | | |
| 2004/0123977 A1 | 7/2004 | Pokharna et al. | | |
| 2009/0059515 A1 | 3/2009 | Tsakanikas | | |
| 2010/0214736 A1 | 8/2010 | Zhang | | |

FOREIGN PATENT DOCUMENTS

JP 11-003583 1/1999

OTHER PUBLICATIONS

International Searching Authority. International Search Report. Date of mailing Feb. 9, 2012. International Application No. PCT/US2011/040445. International Filing Date Jun. 15, 2011.

* cited by examiner

*Primary Examiner* — Adam B Dravininkas
(74) *Attorney, Agent, or Firm* — Rathe Patent & IP Law

(57) ABSTRACT

A method and apparatus are configured to partition a computing system chassis (22, 222) interior into first and second thermal chambers (60, 62, 260, 262), wherein the first thermal chamber (60, 260) includes a processor (24, 224), a memory (30, 230) and a chipset (28, 228) and the second thermal chamber (62, 262) includes an optical disk drive cage (46, 246), a hard disk drive (44, 244) and a power supply (40, 240). A fan unit (110, 410) is configured to be secured within the optical disk drive cage (46, 246).

15 Claims, 10 Drawing Sheets

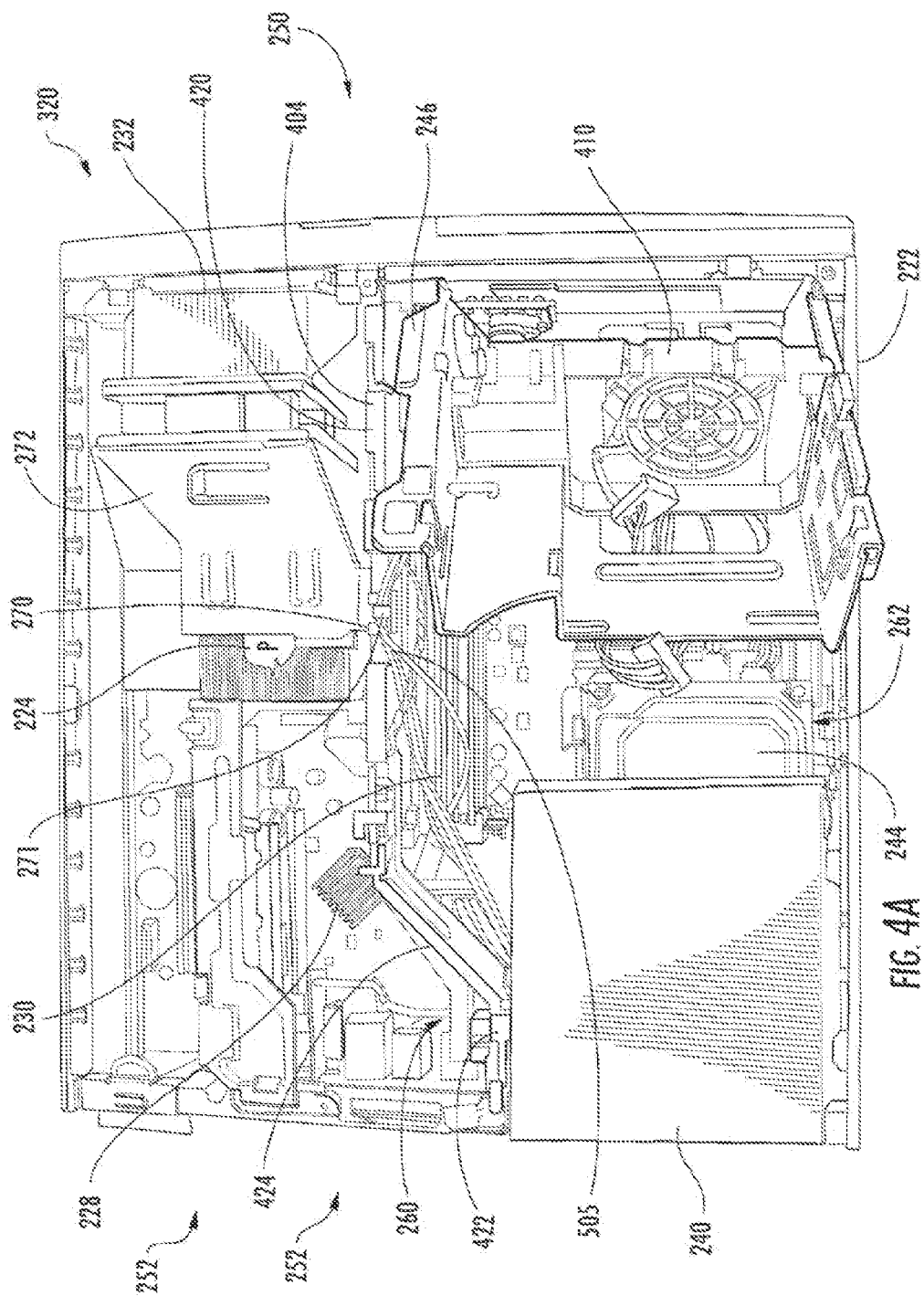

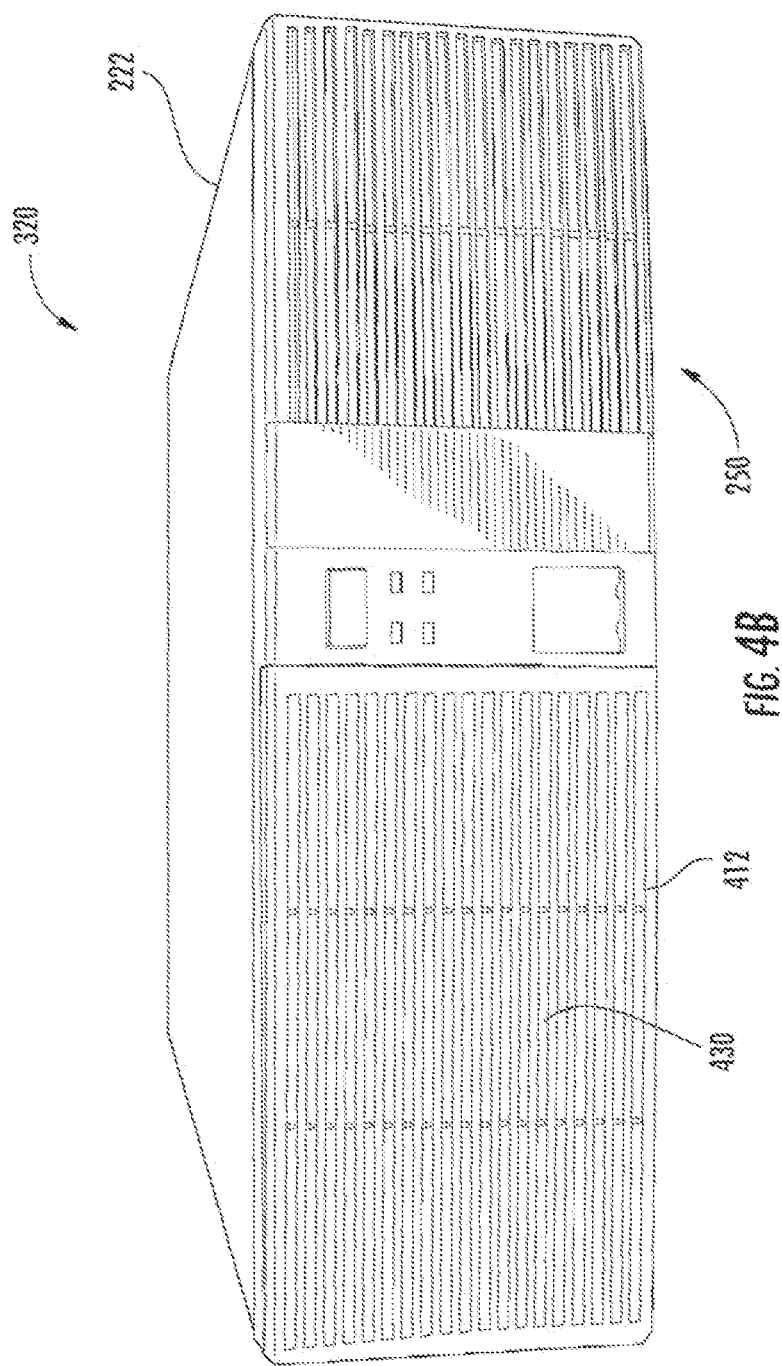

THERMAL CHAMBER PARTITION AND FAN UNIT FOR COMPUTER SYSTEM

BACKGROUND

Computer systems are sometimes used in hot environments such as outdoor environments, commercial kitchens, assembly lines, closed machines and the like. Existing computer systems may not be suited for operation in such hot environments, potentially reducing the reliability or lifespan of such computer systems.

BRIEF DESCRIPTION OF THE DRAWINGS

FIG. 4A is a top perspective view of the computer system of FIG. 3A modified by the conversion kit of FIG. 2.

FIG. 4B is a front perspective view of the computer system of FIG. 4A.

DETAILED DESCRIPTION OF THE EXAMPLE EMBODIMENTS

Figure 1:
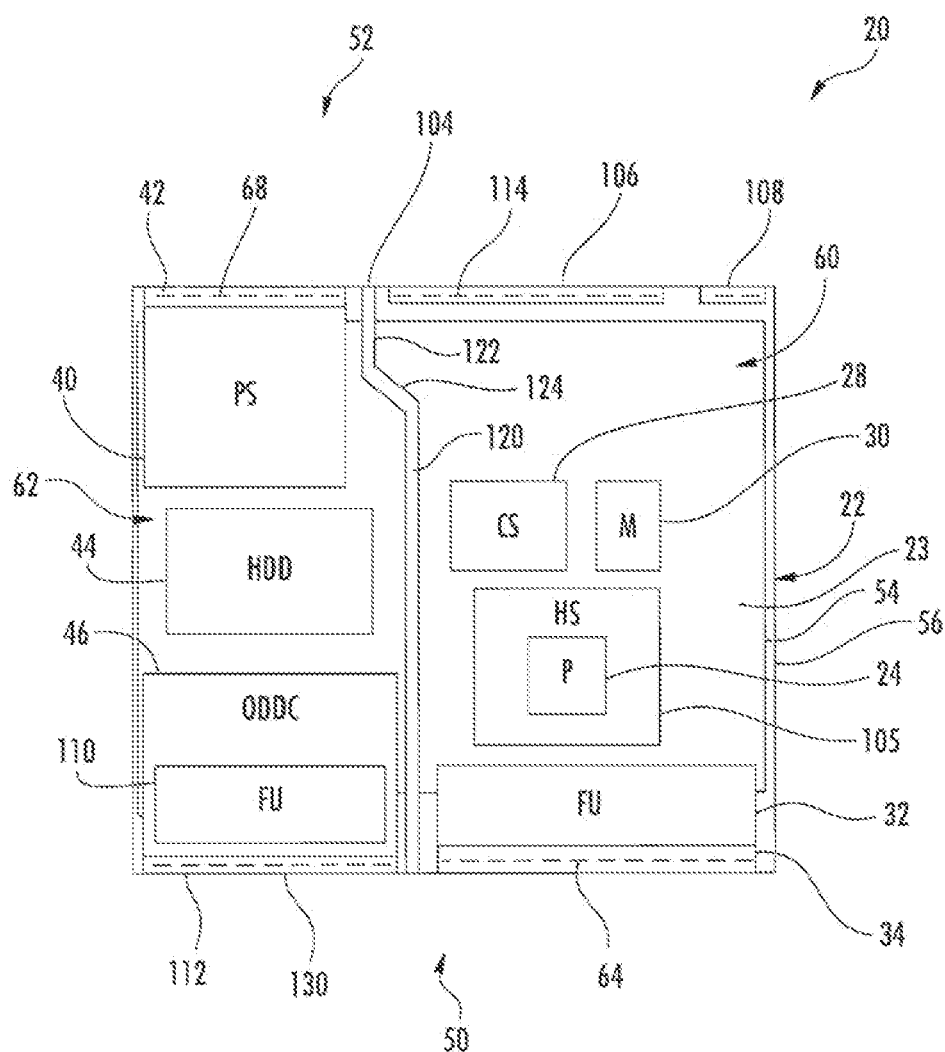
FIG. 1 is a schematic illustration of a computer system according to an example embodiment.

FIG. 1 schematically illustrates one example of a computing system 20 having enhanced suitability for operation in warm or hot environments, such as environments where the temperature exceeds 50° C. Computing system 20 comprises chassis 22, motherboard 23, partition 104, processor 24, heat sink 105, chipset 28, memory 30, fan unit 32, vent 34, vents 106, 108, power supply 40, vent 42, hard disk drive 44, optical disk drive cage 46, fan unit 110 and vent 112.

Chassis 22 comprises a housing, free or other structure supporting and enclosing remaining components of computing system 20. Chassis 22 has a front side 50 and a rear side 52. Chassis 22 has a floor 54, peripheral walls 56 and a top (not shown) which enclose the components of computing system 20.

Motherboard 23, also known as a mainboard, system board or logic board, comprises a central printed circuit configured to hold components of the system while providing connectors for other peripherals. In the example illustrated, motherboard 23 extends along the floor 53, below partition 104, processor 24, heat sink 105, chipset 28, memory 30, power supply 40, hard disk drive 44 and optical disk drive cage 46. In other embodiments, in lieu of being oriented in a substantially horizontal plane, motherboard 23 may alternatively extend vertical while supporting processor 24, chipset 28 and memory 30.

Partition 104 comprises a substantially imperforate panel, member, barricade or wall secured and supported within chassis 22 so as to divide, separate or partition an interior of chassis 22 into a first thermal chamber 60 and a second thermal chamber 62. Partition 104 blocks heat generated by processor 24 and assists in ventilation. Partition 104 guides or directs airflow front fan writs 32 and 110 such that air drawn by fan units 32 and 110 flows into front 50, flows across chassis 22 and flows out rear 52 without a substantial amount of airflow crossing partition 104. As a result, partition 104 assists in ensuring that airflow generated by fan unit 32 is across those components in thermal chamber 60 and that airflow generated by fan unit 110 is across those components in thermal chamber 62.

As shown by FIG. 1, in the example illustrated, partition 104 includes portions 120, 122 and 124. Portions 120 and 122 are offset with respect to one another so as to extend in different planes and so as to accommodate vents 106. Portion 124 interconnects portions 120 and 124. In other embodiments, partition 104 may have other bends, curves or shapes to accommodate other components. In some embodiments, partition 104 may be planar and linear.

Thermal chamber 60 contains and includes processor 24, chipset 28, memory 30, heat sink 105, fan unit 32, vent 34, and vents 106, 108. Processor 24 performs computational tasks for computer system 20. Heat sink 105 extends adjacent to processor 24 to withdraw or extract heat generated by processor 24 and transmit such heat to airflow through thermal chamber 60. In the example illustrated, heat sink 105 comprises a copper-based beat sink. In other embodiments, heat sink 105 may have other configurations or may be made from other materials.

Chipset 28 comprises a set or group of integrated circuits configured to control communications between the processor 24 and external devices. In some embodiments, chipset 28 may be omitted or incorporated into other components. Memory 30 comprises one or more memory storage devices formed from semiconductor technology and configured to store information. In the example illustrated, memory 30 comprises volatile and non-volatile memory formed from integrated circuits including silicon-based transistors.

Fan unit 32 comprises a fan supported at front 50 of chassis 22 so as to move air through vents 34 at front 50, across thermal chamber 60 and through vents 106 and 108 where the air exits. Vent 34 comprises a panel or cover along a front face of chassis 22 having one or more vent openings 64 through which air is pulled into the interior of chassis 22 by fan unit 32.

Vents 106, 108 comprise panels or coverings along a periphery of chassis 22 along a rear face of chassis 22. Vents 106, 108 include vent openings 114 through which air is discharged from thermal chamber 60. In the example illustrated, vents 106 comprise vented slot covers mounted into and across openings in chassis 22 that are otherwise configured to receive optional add in printed circuit boards or cards. In the example illustrated, vents 106 comprise vented slot covers configured to fit into and mount to and across full-height card slot openings. Vents 108 comprise vented slot covers configured to fit into and mount to and across half-height card slot openings.

Thermal chamber 62 contains and includes power supply 40, vent 42, hard disk drive 44, optical disk drive cage 46, fan unit 110 and vent 112. Power supply 40 comprise a device configured to supply DC power to the other components in computer system 20. In the example illustrated, power supply 40 converts general-purpose alternating current (AC) electric power from the mains (110V to 120V at 60 Hz [115V nominal] in North America, parts of South America, Japan, and Taiwan; 220V to 240V at 50 Hz [230V nominal] in most of the rest of the world) to low-voltage (for a desktop computer: 12V, 5V, 5VSB, 3V3, −5V, and −12V) direct current (DC) power for the internal components of the computer system 20. In one embodiment, power supply 40 may conform to the ATX form factor. In other embodiments, power supply 40 may have other configurations.

Vent 42 comprises a vented panel, cover or wall located at rear 52 of chassis 22 along a periphery of chassis 22. Vent 42 includes vent openings 68 through which air is discharged from thermal chamber 62 by fan unit 110. In one embodiment, vent 42 is provided as part of power supply 40. In other embodiments, vent 24 may have other configurations.

Hard disk drive (HDD) 44 comprises a non-volatile, random access device for digital data. In one embodiment, hard disk drive 44 comprises rotating rigid discs on a motor-driven spindle within a protective enclosure. Data is magnetically read from and written to the platter by read/write heads that float on a film of air above the platters. In other embodiments, hard disk drive 44 may have other configurations for providing random access non-volatile digital storage.

Optical disk drive cage 46 comprises a housing, frame, bracket or other structure mounted or secured to chassis 22. Optical disk drive cage 46 is configured to support and secure an optical disk drive, a drive that uses laser light or electromagnetic waves near the light spectrum to read and/or write data (also known as writers or burners) to or from optical media or discs (i.e. Compact discs, DVDs, and Blu-ray discs). Optical disk drive cage 46 provides an existing structure to which fan unit 110 may be mounted. Optical disk drive cage 46 provides computer system 20 with the ability to be easily modified to include such an optical disk drive when computer system 20 is no longer being operated in a warm or hot environment.

Fan unit 110 comprises a motor driven fan secured to and within the optical disk drive cage 46 so as to draw air through vent openings 130 of vent 112, across thermal chamber 62 and out vent 68 at rear 52 of chassis 22. In the example illustrated, fan unit 110 is configured to be removably mounted within optical disk drive cage 46 without damaging or reconfiguring optical disk drive cage 46 such that upon removal of fan unit 110, optical disk drive cage 46 may receive an optical disk drive. In the example illustrated, fan unit 110 is configured to be inserted into and to be removed from optical disk drive 46 manually without the use of tools, facilitating convenient and simplified modification of computer system 20 to either provide an optical disk drive or to operate in warmer climates or environments.

Vent 112 comprises a panel, cover, bezel or wall extending along front 50 of chassis 22 between a periphery of front 50 and fan unit 110. Vent 112 includes vent openings 130 through which air is drawn into thermal chamber 62 of chassis 22 by fan unit 110. In the example illustrated, vent 112 comprise a bezel configured to be removably mounted into and across an opening previously configured for providing access to an optical disk drive. In one embodiment, vent 112 is configured to be removably mounted or snapped into or across the optical disk drive opening in a manual fashion without the use of tools, facilitating convenient and simplified modification of computer system 20 to either provide an optical disk drive or to operate in warmer climates or environments.

Figure 2:
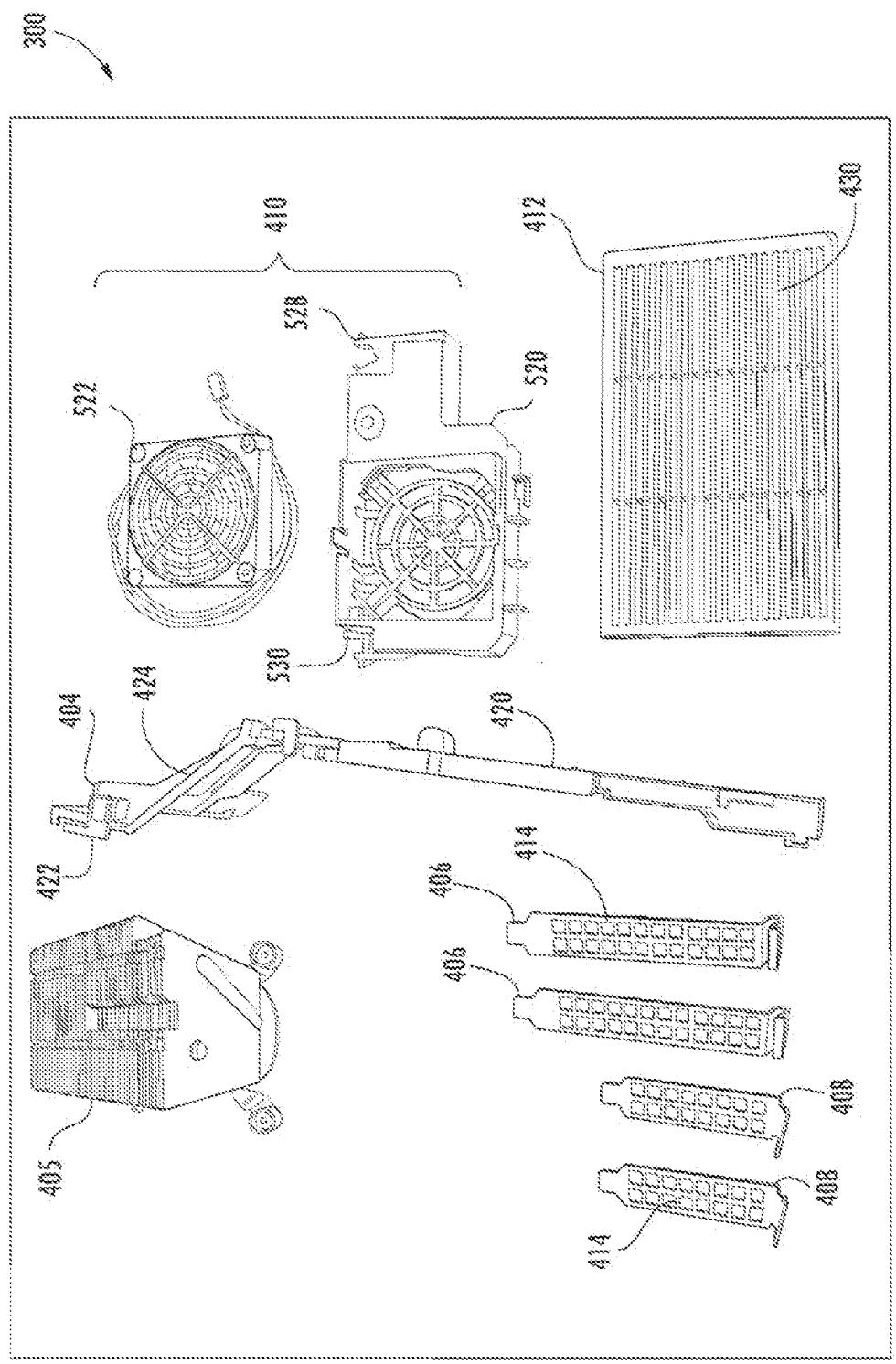
FIG. 2 is a top perspective view of a thermal computer system conversion kit according to an example embodiment.
Figure 3A:
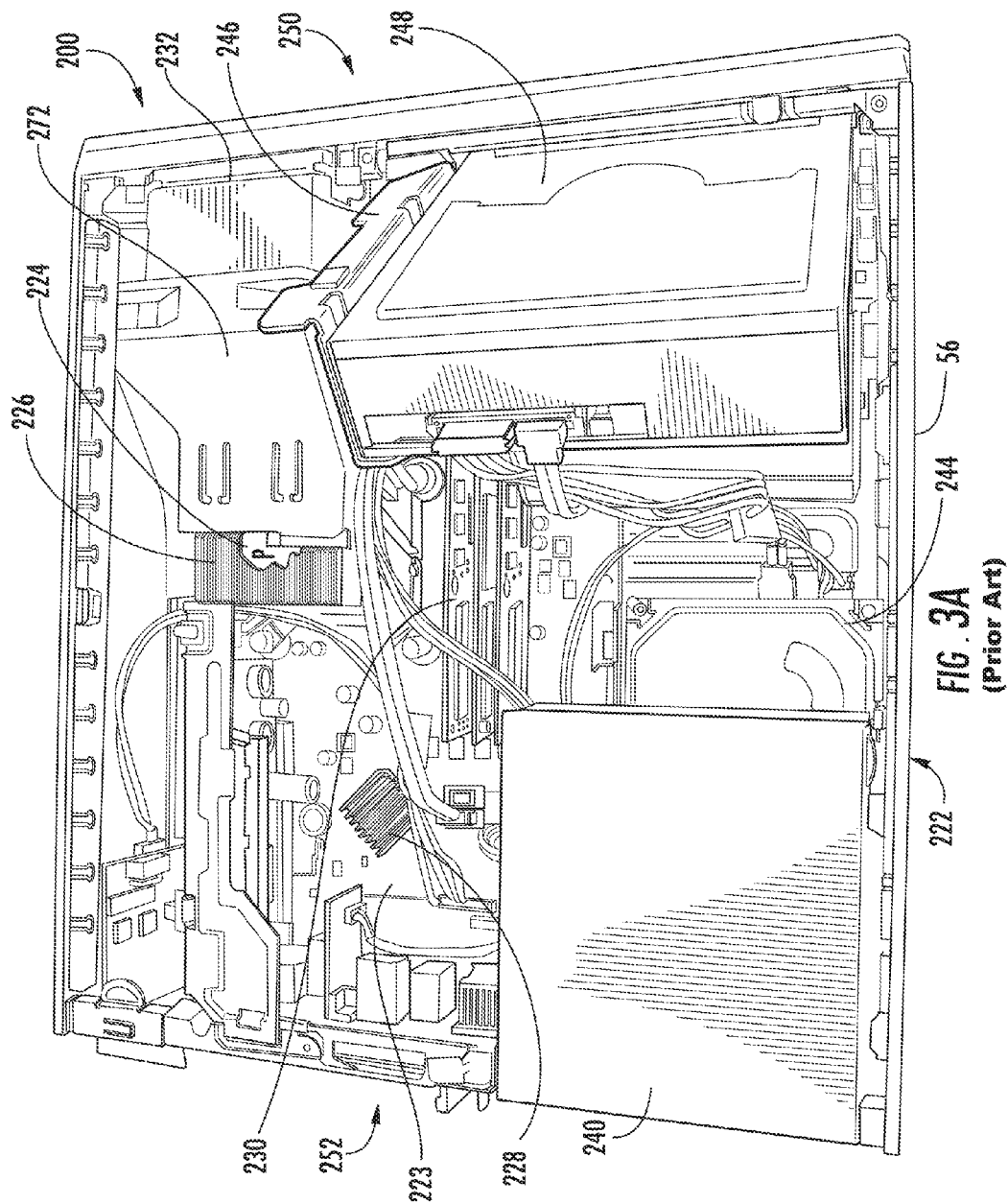
FIG. 3A is a top perspective view of an example computer system to be modified by the conversion kit of FIG. 2.
Figure 3B:
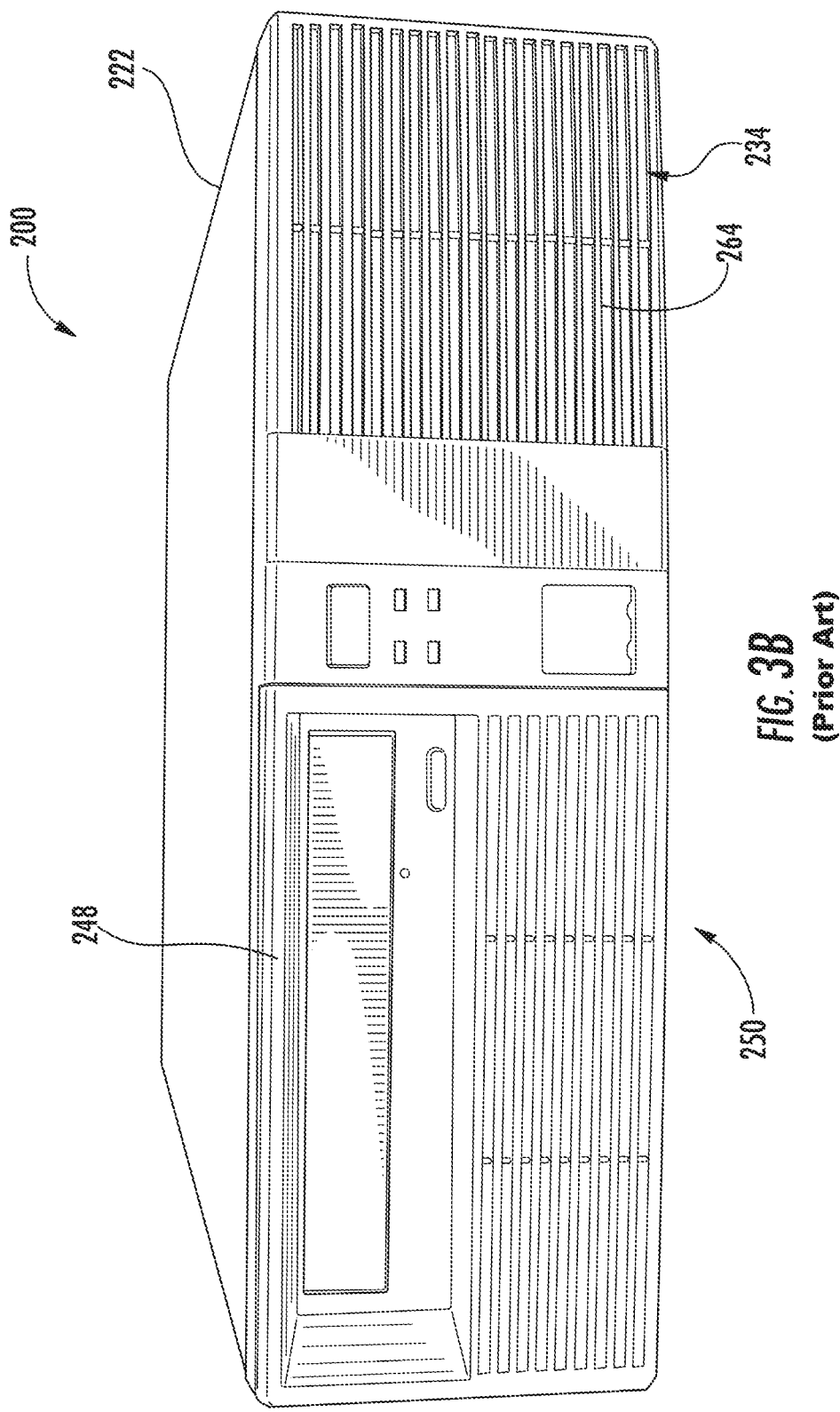
FIG. 3B is a front perspective view of the computer system of FIG. 3A to be modified by the conversion kit of FIG. 2.
Figure 3C:
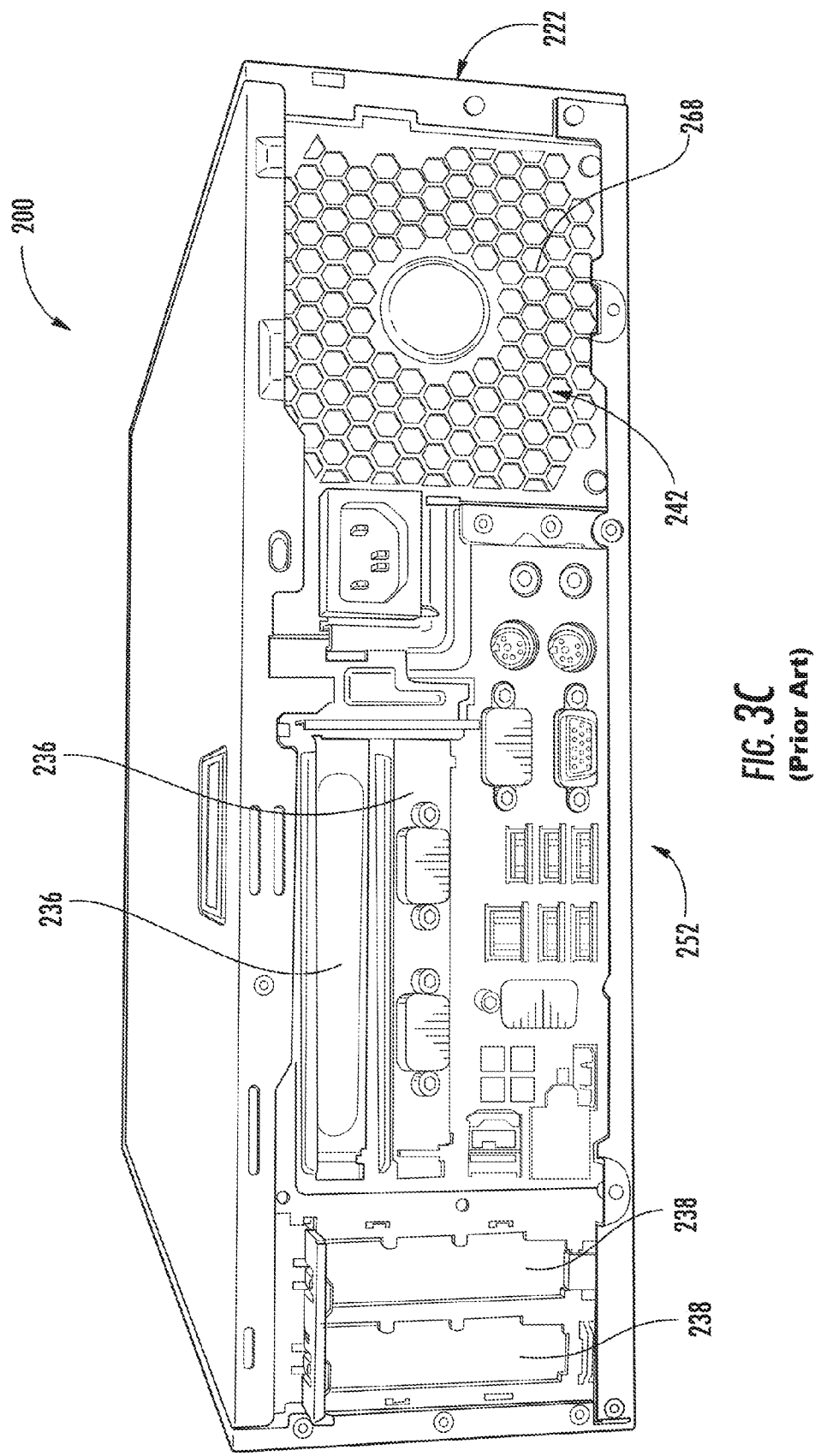
FIG. 3C is a rear perspective view of the example computer system of FIG. 3A to be modified by the conversion kit of FIG. 2.

FIG. 2 illustrates a thermal modification kit 300 for modifying a computer system 200 shown in FIGS. 3A-3C to form computer system 320, a particular embodiment of computer system 20 shown in FIG. 1. As shown by FIGS. 3A-3C, computer system 200, which is to be modified using kit 300, comprises chassis 222, motherboard 223, processor 224, heat sink 226, chipset 228, memory 230, fan unit 232, vent 234, expansion card covers 236, 238, power supply 240, vent 242, hard disk drive 244, optical disk drive cage 246, and optical disk drive 248.

Chassis 222 comprises a housing, frame or other structure supporting and enclosing remaining components of computing system 200. Chassis 222 has a front side 250 and a rear side 252. Chassis 222 has a floor (not viewable), peripheral walls 56 and a top (not shown) which enclose the components of computing system 200.

Motherboard 223 comprises a central printed circuit configured to hold components of the system while providing connectors for other peripherals. In the example illustrated, motherboard 223 extends along the floor below processor 224, heat sink 226, chipset 228, memory 230, power supply 240, hard disk drive 244 and optical disk drive cage 246. In other embodiments, in lieu of being oriented in a substantially horizontal plane, motherboard 223 may alternatively extend vertical while supporting processor 224, chipset 228 and memory 230.

Chipset 228 comprises a set or group integrated circuits configured to control communications between the processor 224 and external devices. In some embodiments, chipset 228 may be omitted or incorporated into other components. Memory 230 comprises one or more memory storage devices form from semiconductor technology and configured to store information. In the example illustrated, memory 30 comprises volatile and non-volatile memory formed from integrated circuits including silicon-based transistors.

Fan unit 232 comprises a motor driven fan supported at front 250 of chassis 222 so as to draw air into chassis 222 through vents 238 (shown in FIG. 3B), across an interior of chassis 222 and out through vents 236 and 238 at front 252. Vent 234 comprises a panel or cover along a front face of chassis 222 having one or more vent openings 264 through winch air is drawn into the interior of chassis 222 by fan unit 232.

Power supply 240 comprises a device configured to supply DC power to the other components in computer system 200. In the example illustrated, power supply 240 converts general-purpose alternating current (AC) electric power from the mains (110V to 120V at 60 Hz [115V nominal] in North America, parts of South America, Japan, and Taiwan; 220V to 240V at 50 Hz [230V nominal] in most of the rest of the world) to low-voltage (for a desktop computer: 12V, 5V, 5VSB, 3V3, −5V, and −12V) direct current (DC) power tor the internal components of the computer system 20. In one embodiment, power supply 240 may conform to the ATX form factor. In other embodiments, power supply 240 may have other configurations.

Vent 42 comprises a vented panel, cover or wall located at rear 252 of chassis 222 along a periphery of chassis 222. Vent 242 includes vent openings 268 through which air is discharged from chassis 222 by fan unit 410. In one embodiment, vent 242 is provided as part of power supply 240. In other embodiments, vent 242 may have other configurations.

Hard disk drive (HDD) 244 comprises is a non-volatile, random access device for digital data. In one embodiment, hard disk drive 244 comprises rotating rigid discs on a motor-driven spindle within a protective enclosure. Data is magnetically read from and written to the platter by read/write heads that float on a film of air above the platters. In other bonds, hard disk drive 244 may have other configurations for providing random access non-volatile digital storage.

Optical disk drive cage 246 comprises a housing, frame, bracket or other structure mounted or secured to chassis 222. Optical disk drive cage 246 is configured to support and secure optical disk drive 248.

Optical disk drive 248 comprises a drive that uses laser light or electromagnetic waves near the light spectrum to read data. In one embodiment, optical disk drive 248 may also be configured to write data, wherein optical disk drive 248 may also be referred to as a writer or burner. Examples of optical media or discs that may be read or written to buy optical disk drive 248, include, but are not limited to, compact discs, DVDs, and Blu-ray discs.

FIG. 2 illustrates thermal modification kit 300 for modifying a computer system 200 shown in FIGS. 3A-3C to form computer system 320 as shown in FIGS. 4A-13. Modification kit 300 comprises partition 404, heat sink 405, vents 406, 408, fan unit 410 and vent 412.

Partition 404 comprises a substantially imperforate panel, member, barricade or wall configured to be secured and supported within chassis 222 so as to divide, separate or partition an interior of chassis 222 into a first thermal chamber 260 and a second thermal chamber 262 (shown in FIG. 4A). Thermal chamber 260 contains and includes processor 224, chipset 228, memory 230, heat sink 405, fan unit 232, vent 234, and vents 406, 408. Thermal chamber 262 contains and includes power supply 240, vent 242, hard disk drive 244, optical disk drive cage 246, fan unit 410 and vent 412.

Partition 404 blocks heat generated by processor 224 and assists in ventilation. Partition 404 guides or directs airflow from fan units 32 and 410 such that air drawn by fan units 32 and 410 flows into front 250, across chassis 222 and out rear 252 without a substantial amount of airflow crossing partition 404. As a result, partition 404 assists in ensuring that airflow generated by fan unit 232 is across those components in thermal chamber 260 and that airflow generated by fan unit 410 is across those components in thermal chamber 262.

As shown by FIGS. 2 and 4A, the example partition 404 includes portions 420, 422 and 424. Portions 420 and 422 are offset with respect to one another so as to extend in different planes and so as to accommodate vents 406. Portion 424 interconnects portions 420 and 424. In other embodiments, partition 404 may have other bends, curves or shapes to accommodate other components. In some embodiments, partition 404 may be planar and linear.

Figure 5:
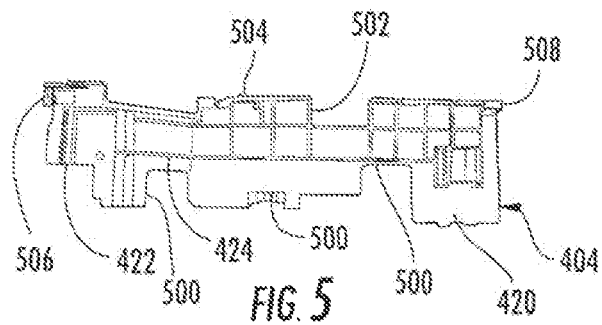
FIG. 5 is a side elevational view of an example partition of the conversion kit FIG. 2.

FIGS. 5-9 illustrate partition 404 in more detail. As shown by FIG. 5, the example partition 404 includes one or more lower notches or cut outs 500, upper cutout 502, clips 504, and connectors 506, 508. Cut outs 500 comprises openings or irregularities along the lower edge of partition 404 which are located and sized such that partition 404 extends around and in close conformity with components or other structures projecting upwardly from motherboard 23 or chassis 222 to accommodate such components while substantially blocking airflow along a lower edge of partition 404. In other embodiments, cut outs 500 may have other configurations or may be omitted.

Upper cutout 502 comprises an opening extending into an upper edge of partition 404. Upper cutout 502 is sized and located so as to accommodate or receive an arm 270 having cable clips 271 and projecting from a fan duct 272 of fan unit 232 (shown in FIG. 4A). Clips 504 extend along an upper surface of partition 404 and are configured to removably secure or clip or snap about one or more electrical cables or lines such as electrical cables or power lines supplying power from power supply 240 or signal or data communication cables 505 such as shown in FIG. 4A. In other embodiments, cutout 502 or clips 504 may have other configurations or may be omitted.

Figure 6:
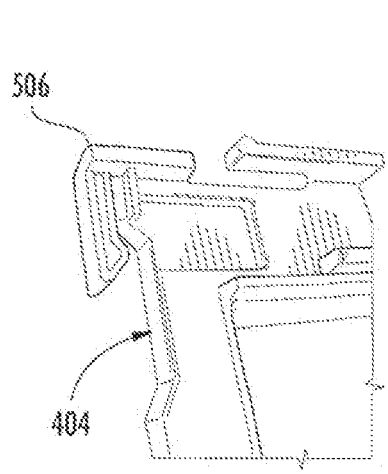
FIG. 6 is an enlarged fragmentary perspective view of a portion of the partition of FIG. 5 taken along line 6-6.
Figure 7:
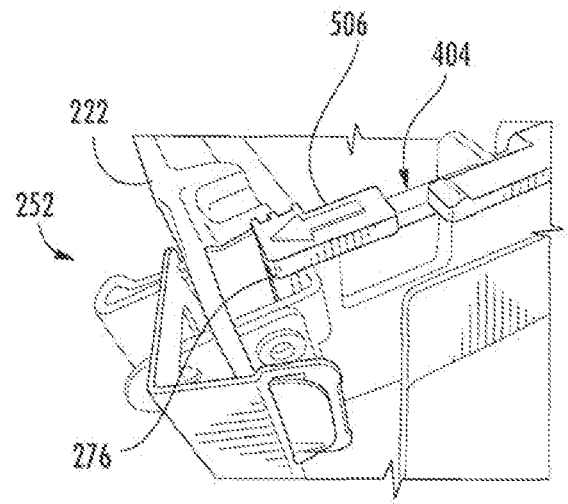
FIG. 7 is an enlarged fragmentary perspective view of the partition of FIG. 6 coupled to the computer system of FIG. 4A.

As shown by FIGS. 5-7, connector 506 projects from portion 422 of partition 404 and is configured to releasably secure partition 404 in place. In the example illustrated, connector 506 is configured to releasably secure partition 404 to rear 252 of chassis 222. In the example illustrated, connector 506 comprises a clip or hook configured to hook over or into, or snap over or into a portion 276 of chassis 222 (shown in FIG. 7) or a structure extending from chassis 222 to directly or indirectly couple partition 404 to chassis 222. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

Connector 506 facilitates securement of partition 404 to chassis 222 in a manual fashion without the use of tools. In other embodiments, connector 506 may alternatively utilize separate fasteners, such as screws, bolts or the like, may have other configurations or may be omitted. In some embodiments, partition 404 may alternatively be secured other structures within chassis 222 rather than being directly coupled to chassis 222.

Figure 8:
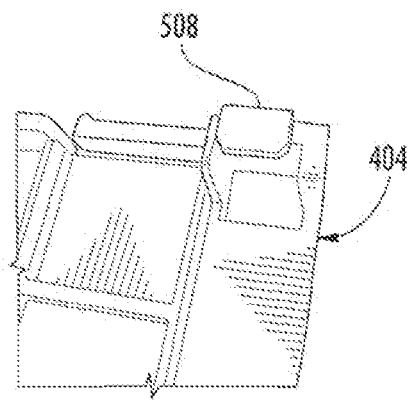
FIG. 8 is an enlarged fragmentary perspective view of a portion of the partition of FIG. 5 taken along line 8-8.
Figure 9:
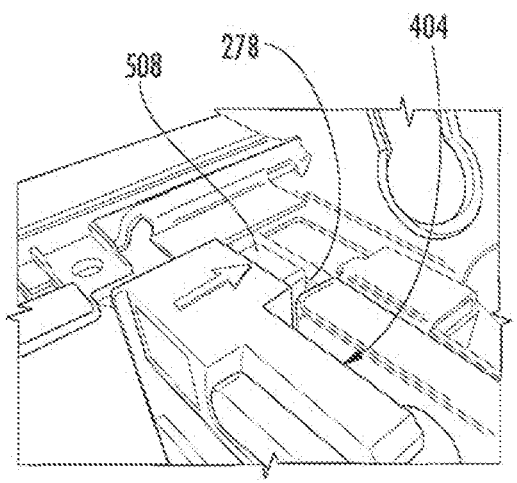
FIG. 9 is an enlarged fragmentary perspective view of the partition of FIG. 8 coupled to the computer system of FIG. 4A.

As shown by FIGS. 5, 8 and 9, connector 508 projects from portion 420 of partition 404 and is configured to releasably secure partition 404 in place. In the example illustrated, connector 508 is configured to releasably secure partition 404 proximate to front 250 of chassis 222. As shown by FIG. 9, connector 508 comprises a clip or hook configured to hook over or into, or snap over or into a portion 278 of optical disk drive cage 246.

Connector 508 facilitates securement of partition 404 to cage 246 and chassis 222 in a manual fashion without the use of tools. In other embodiments, connector 508 may alternatively utilize separate fasteners, such as screws, bolts or the like, may have other configurations or may be omitted. In some embodiments, partition 404 may alternatively be secured to chassis 222 or other structures within chassis 222 rather than being directly coupled to cage 246.

Heat sink 405 comprises a heat sink configured to replace heat sick 226 of computer system 200. In the example illustrated, heat sink 405 is formed from a more thermally conductive material, such as copper, as compared to the material of heat sink 226, such as aluminum. Heat sink 405 facilitates the conduction and dissipation of heat generated by processor 224 which may be better discharged by the architecture of the modified computer system 320. When mounted in computer system 200 in place of heat sink 226 as shown in FIG. 4A, heat sink 405 extends adjacent to processor 224 (schematically shown) to withdraw or extract heat generated by processor 224 and transmit such heat to airflow through thermal chamber 260. In other embodiments, heat sink 405 may have other configurations, may be made from other materials or may be omitted from kit 300.

Figure 4C:
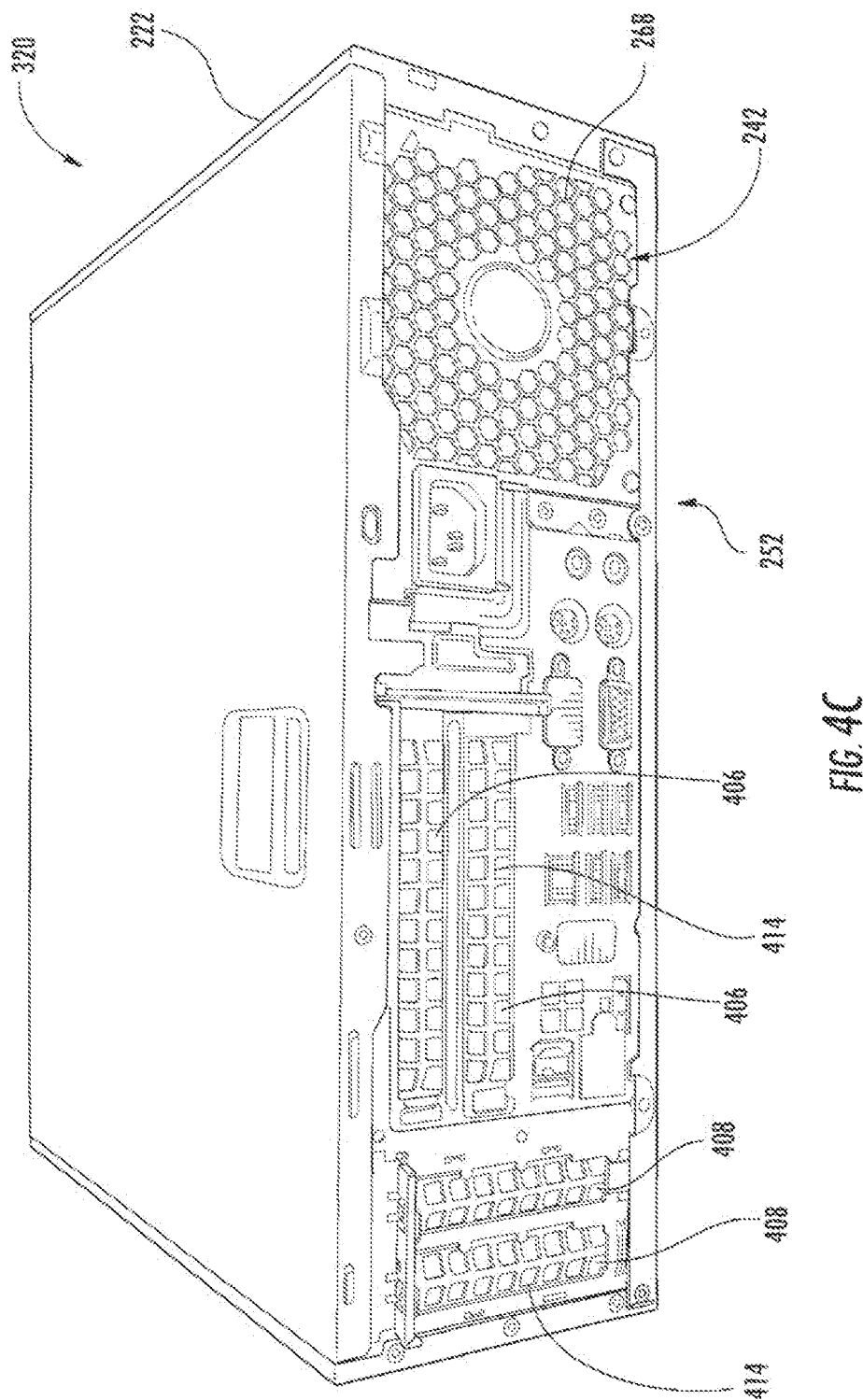
FIG. 4C is a rear perspective view of the computer system of FIG. 4A.

Vents 406, 408 comprise panels or coverings along a periphery of chassis 222 along a rear face of chassis 222. Vents 406, 408 includes vent openings 414 through which air is exhausted from thermal chamber 260. As shown by FIG. 4C, vents 406, 408 comprise vented slot covers mounted into and across openings in chassis 222 that are otherwise configured to receive optional add in printed circuit boards or cards. In the example illustrated, vents 406 comprise vented slot covers configured to fit into and mount to and across full-height card slot openings. Vents 408 comprise vented slot covers configured to fit into and mount to and across half-height card slot openings.

Fan unit 410 comprises a motor driven fan configured to be secured to and within the optical disk drive cage 246, as shown in FIG. 4A, so as to draw air through vent openings 430 of vent 412, across thermal chamber 262 and out vent 242 at rear 252 of chassis 222. In the example illustrated, fan unit 410 is configured to be removably mounted within optical disk drive cage 246 without damaging or reconfiguring optical disk drive cage 246 such that upon removal fan unit 410, optical disk drive cage 246 may receive an optical disk drive. In the example illustrated, fan unit 410 is configured to be inserted into and to be removed from optical disk drive cage 246 manually without the use of tools, facilitating convenient and simplified switching between computer system 200 having an optical disk drive or peer system 320 configured to operate in warmer climates or environments.

As shown by FIG. 2, fan unit 410 comprises fan holder 520 and fan 522. Fan holder 520 serves as a mounting interface between the motor driven fan 522 and optical disk drive cage 246. Fan holder 520 is configured to mount the fan 522 within optical disk drive cage 246. Fan holder 520 is mounted to or receives motor driven fan 522 such that holder 520 and fan 52 form a fan unit.

Figure 10:
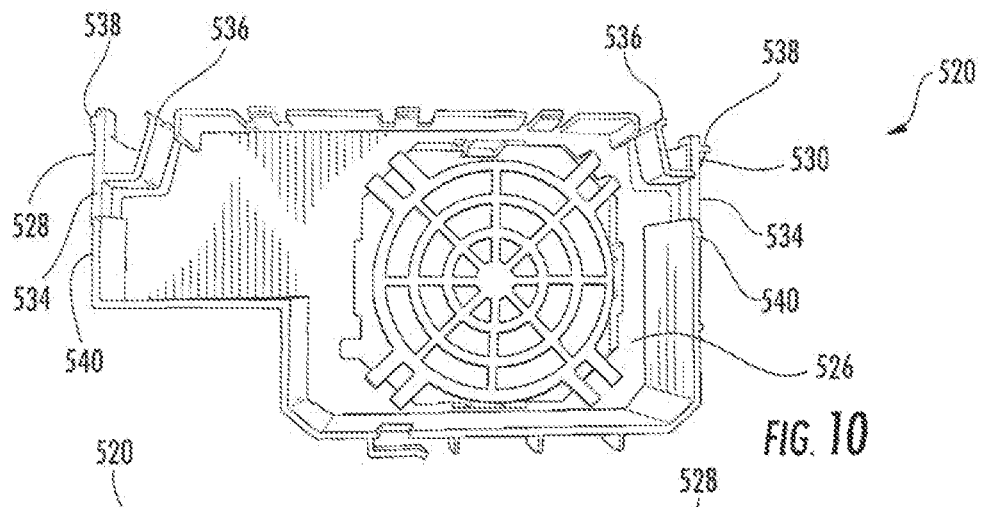
FIG. 10 is a side elevational view of an example fan holder of the conversion kit FIG. 2.

FIGS. 10-13 illustrate fan holder 520 in more detail. As shown by FIG. 10, fan holder 520 includes fan receiving cavity 526 and connectors 528, 530. Fan receiving cavity 526 is sized to receive fan 522 and to retain or secure fan 522 in place.

Figure 11:
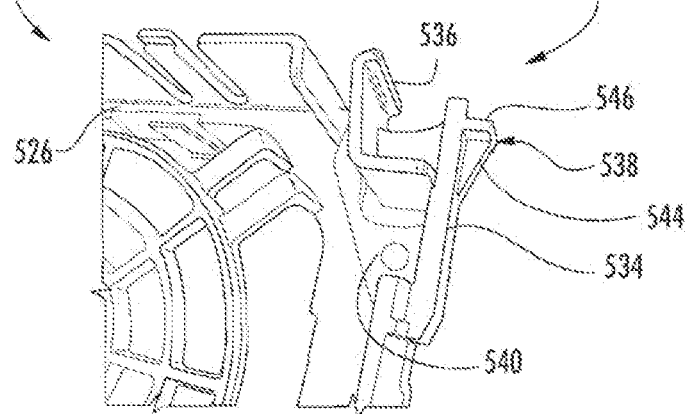
FIG. 11 is an enlarged fragmentary perspective view of a portion of the fan holder of FIG. 10 taken along line 11-11.

Connectors 528, 530 extend on opposite sides of fan holder 520 and are each configured to couple and secure fan holder 520 in place within an interior of optical disk drive cage 246. As shown by FIG. 11, each of connectors 528, 530 comprises a resiliently flexible arm 534, actuation lever 536 and a projection or catch 538. Arm 534 resiliently extends from a body 540 of fan holder 522. Arm 534 supports lever 536 and catch 538. Arm 534 resiliently supports catch 538 for resilient movement from a resting or default extended position in which catch 538 is inwardly distanced in body 540 by a first distance and a retracted position in which catch 538 is outwardly distanced from body 540 by second smaller distance.

Actuation lever 536 projects from arm 534 and provides a tab allowing a person to manually move or flex arm 534 from the extended position to the retracted position, allowing catch 538 to be inserted into or withdrawn from coupling connection with optical disk drive 246.

Figure 12:
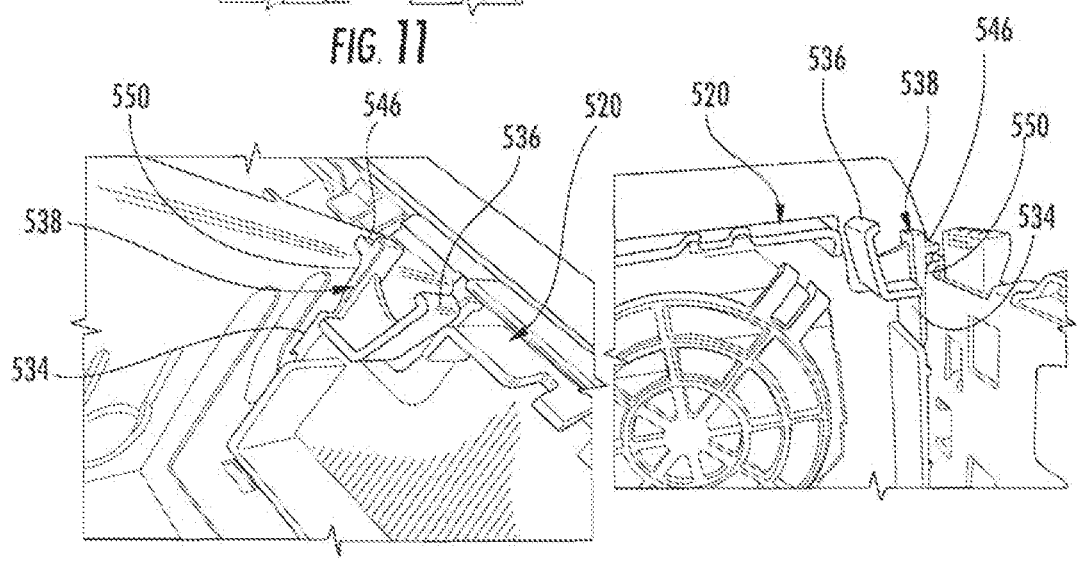
FIG. 12 is an enlarged fragmentary perspective view of the fan holder of FIG. 10 coupled to the computer system of FIG. 4A.
Figure 13:
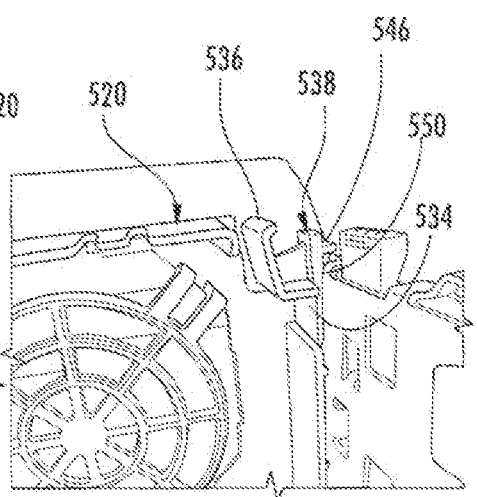
FIG. 13 is an enlarged fragmentary perspective view of the fan holder of FIG. 11 coupled to the computer system of FIG. 4A.

Catch 538 is configured to releasably interact with optical disk drive cage 246 to secure fan holder 520 in place relative to optical disk drive cage 246. In the example illustrated, catch 538 includes gusset 544 with a tab 546. As shown by FIGS. 12 and 13, when arm 534 is in the extended position, gussets 544 are received within corresponding channels, grooves or slots 550 on opposite sides of optical disk drive cage 246 to horizontally retain holder 520 in place and tabs 546 project over an upwardly facing surface of optical disk drive cage 246 to vertically retain holder 520 in place within optical disk drive cage 246. Insertion or withdrawal of flanges 544 from slots 550 may be achieved by a person manually pressing levers 536 to flex arms 534 and catches 538 inwardly towards the centerline optical disk drive cage 246.

In the example illustrated, connectors 528 and 530 facilitate manual connection of fan holder 520 to disk drive cage 246 without the use of tools. In other embodiments, connectors 528, 530 may have other configurations using fasteners or wherein fools are utilized far such mounting of holder 520. In some embodiments, holder 520 and fan 522 may be provided as a single integral unit. In yet other embodiments, other connectors the same as or similar to connectors 528 or 530 may be provided directly on fan 522.

As shown by FIGS. 2 and 4B, vent 412 comprises a panel, cover, bezel or wall extending along front 250 of chassis 222 between a periphery of front 250 and fan unit 410. Vent 412 includes vent openings 430 through which air is drawn into thermal chamber 262 of chassis 222 by fan unit 410. In the example illustrated, vent 412 comprise a bezel configured to be removably mounted into and across an opening previously configured for providing access to an optical disk drive (shown in FIG. 3B). In one embodiment, vent 412 is configured to be removably mounted or snapped into or across the optical disk drive opening in a manual fashion without the use of tools, facilitating convenient and simplified switching between computer system 200 having an optical disk drive or computer system 320 configured to operate in warmer climates or environments.

Overall, kit 300 facilitates convenient and relatively easy conversion of computer system 200 having an optical disk drive to a computer system 320 configured to operate in warmer climates or environments. Such a modification or conversion involves (1) removing the optical disk drive 248; (2) securing a fan unit 410 in optical disk drive cage 246; and (3) securing partition 404 in chassis 222 to divide the interior of chassis 222 into thermal chamber 260 having a processor 224, chipset 228, memory 230 and thermal chamber 262 having optical disk drive cage 246, hard disk drive 244 and power supply 240. In one embodiment, such conversion additionally involves (4) removing the existing cover of computer system 200 and replacing with cover 412 having vent openings 430 and (5) replacing a substantially imperforate card slot covers 236, 238 shown in FIG. 3C with the vents 406, 408 as shown in FIG. 4C.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
a partition configured to be secured in place in a chassis of a computer system so as to divide the chassis into a first thermal chamber having a processor a memory and a chipset and a second thermal chamber having an optical disk drive cage a hard disk drive and a power supply;
cable clips in the partition, the cable clips to receive cables; and
a fan unit configured to be secured in the optical disk drive cage.

2. The apparatus of claim 1, wherein the fan unit is configured to be releasably snapped, in a tool less manner, into securement with the optical disk drive cage.

3. The apparatus of claim 2, when the fan unit is configured to extend across the optical disk drive cage, in a snapping interlocking engagement with opposite side walls of the optical disk drive cage.

4. The apparatus of claim 3, wherein the fan unit includes first and second resiliently flexible arms configured to resiliently engage the opposite side walls of the optical disk drive cage.

5. The apparatus of claim 4, wherein the first and second resiliently flexible arms carry first and second catches, respectively.

6. The apparatus of claim 1, wherein the partition is configured to releasably snap, in a tool less manner, into opposite walls of the chassis.

7. The apparatus of claim 1, wherein the partition includes a first portion extending in a first plane and a second portion extending in a second plane offset from the first plane.

8. The apparatus of claim 7, wherein the first portion is adjacent to a first end of the chassis and wherein the second portion is adjacent to a second end of the chassis opposite the first end.

9. The apparatus of claim 1, wherein the partition is configured to be mounted in the chassis so as to extend between a fan in the first chamber and the optical disk drive cage in the second chamber on a first end of the chassis and so as to extend between a full height card slot in the first chamber and the power supply in the second chamber on a second end of the chassis opposite to the first end.

10. The apparatus of claim 1 further comprising one or more vented slot covers configured to be mounted to the chassis in place of substantially imperforate card slot covers.

11. The apparatus of claim 1 further comprising a vented bezel configured to be mounted to the chassis over an optical disk drive opening of the chassis.

12. The apparatus of claim 1 further comprising the chassis, the optical disk drive cage, the processor, the memory, the chipset, the hard disk drive and the power supply.

13. A method comprising:
removing an optical disc drive from an optical disk drive cage within a chassis of a computer system;
securing a fan unit within the optical disk drive cage; and
snapping a partition, in a tool less manner, into opposite walls of the chassis to divide the chassis into a first thermal chamber having a processor, a memory and a chipset and a second thermal chamber having the optical disk drive cage, a hard disk drive and a power supply.

14. The method of claim 13 further comprising:
securing a vented bezel over an optical disk drive opening in the chassis; and
replacing a substantially imperforate card slot cover with a vented card slot cover.

15. An apparatus comprising:
a partition configured to be secured in place in a chassis of a computer system so as to divide the chassis into a first thermal chamber having a processor, a memory and a chipset and a second thermal chamber having an optical disk drive cage, a hard disk drive and a power supply,
wherein the partition is configured to be mounted in the chassis so as to extend between a fan in the first chamber and the optical disk drive cage in the second chamber on a first end of the chassis and so as to extend between a full height card slot in the first chamber and the power supply in the second chamber on a second end of the chassis opposite to the first end; and
a fan unit configured to be secured in the optical disk drive cage.

* * * * *